(12) United States Patent
Bond

(10) Patent No.: US 11,284,624 B2
(45) Date of Patent: Mar. 29, 2022

(54) METHOD OF SUPPRESSING DUST AND REMOVING BIOAEROSOL PARTICLES USING MICROEMULSION FORMULATION

(71) Applicant: Jerry R. Bond, Flowery Branch, GA (US)

(72) Inventor: Jerry R. Bond, Flowery Branch, GA (US)

( * ) Notice: Subject to any disclaimer, the term of this patent is extended or adjusted under 35 U.S.C. 154(b) by 151 days.

(21) Appl. No.: 16/520,681

(22) Filed: Jul. 24, 2019

(65) Prior Publication Data

US 2020/0029577 A1    Jan. 30, 2020

Related U.S. Application Data

(60) Provisional application No. 62/711,785, filed on Jul. 30, 2018.

(51) Int. Cl.
| | | |
|---|---|---|
| *A01N 65/22* | (2009.01) | |
| *A01N 37/04* | (2006.01) | |
| *A01N 25/04* | (2006.01) | |
| *A01N 25/30* | (2006.01) | |
| *A01N 31/02* | (2006.01) | |
| *A01N 37/36* | (2006.01) | |
| *A01N 65/16* | (2009.01) | |
| *A01N 31/08* | (2006.01) | |

(52) U.S. Cl.
CPC ............. *A01N 65/22* (2013.01); *A01N 25/04* (2013.01); *A01N 25/30* (2013.01); *A01N 31/02* (2013.01); *A01N 31/08* (2013.01); *A01N 37/04* (2013.01); *A01N 37/36* (2013.01); *A01N 65/16* (2013.01)

(58) Field of Classification Search
None
See application file for complete search history.

*Primary Examiner* — John Pak
*Assistant Examiner* — Daniel L Branson
(74) *Attorney, Agent, or Firm* — Clark & Brody LP

(57) ABSTRACT

An all 25(b) botanical food grade, all purpose cleaner, anti-microbial and disinfectant includes a microemulsion that contains effective amounts of the ingredients of thyme oil, wintergreen oil, a surfactant, citric acid, and isopropanol. The ingredients combined with water to produce a clear microemulsion for application as a cleaner/disinfectant as well as treating growing and harvested crops, animals and pets for pesticide purposes and as a dust suppressant and to disrupt bioaerosols in the air and/or remove them from the air. Areas of treatment can include hospitals, homes, construction sites, open areas outside, laboratories, and the like.

5 Claims, 1 Drawing Sheet

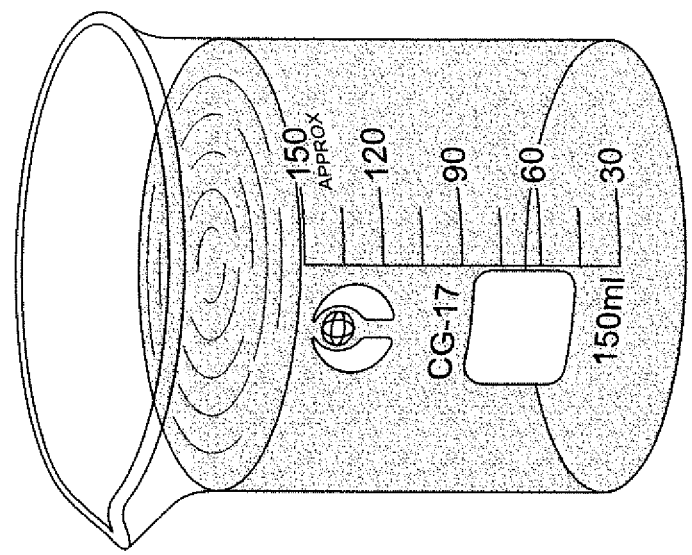
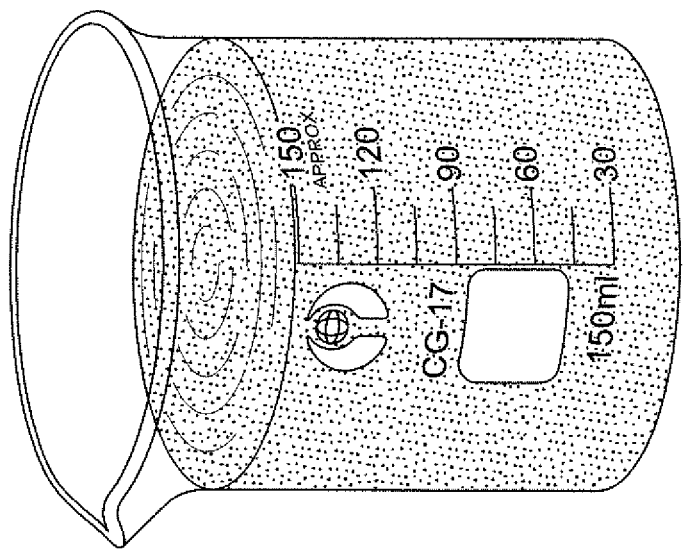
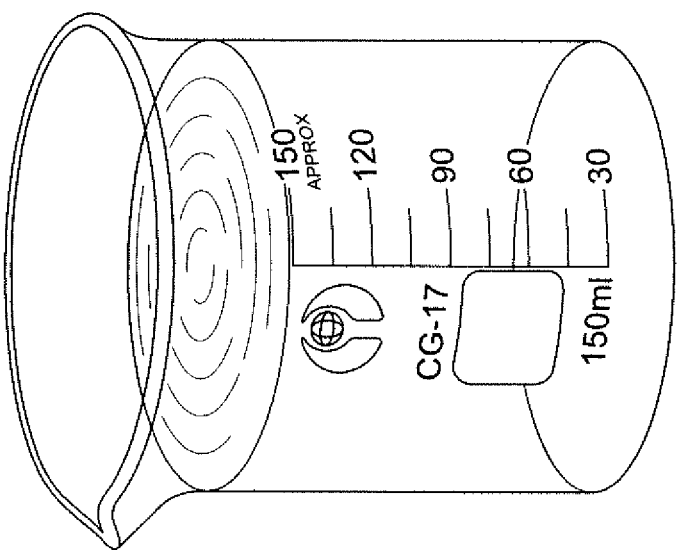

METHOD OF SUPPRESSING DUST AND REMOVING BIOAEROSOL PARTICLES USING MICROEMULSION FORMULATION

This application claims priority under 35 USC 119(e) based on provisional application No. 62/711,785 filed on Jul. 30, 2018, said application being incorporated by reference in its entirety herein.

FIELD OF THE INVENTION

The invention relates to an all-purpose cleaner, disinfectant, and pesticide microemulsion and method of use, and particularly a thyme oil-based microemulsion that is FIFRA 25(b) compliant and can be used as a disinfectant for agricultural purposes, a common disinfectant as a cleaning disinfectant to be used on crops before and after harvest, as a common disinfectant for homes, hospitals, animals, and the like, a dust suppressant, and to remove and/or disrupt bioaerosol particles.

BACKGROUND ART

Thyme oil-based formulations for cleaning and disinfection purposes are known in the prior art. One type employs copper sulfate as the active antibacterial component. Another is based on a synthetic thyme oil product called Thymox. Neither of these products is a natural product that can be characterized as a minimum risk pesticide that is exempt from registration under the Federal Insecticide, Fungicide, and Rodenticide Act (FIFRA). An EPA 25(b) product is one whose active and inactive ingredients are only those found on the EPA's listing, attached herewith. Therefore, there is still a need for a cleaner to meet the criteria of a 25(b) and the present invention responds to this need.

SUMMARY OF THE INVENTION

One object of the invention is a microemulsion that has a number of applications in the fields of cleaning and/or disinfecting a surface by applying the microemulsion to the surface or treating an animal or plants for at least pest control by applying an effective amount of the microemulsion to the plants or the animal.

In one embodiment, the microemulsion comprises, in weight percent:
thyme oil in an amount ranging from about 0.195 to about 0.276%;
wintergreen oil in an amount ranging from about 0.128 to about 0.207%;
at least one 25(b) surfactant in an amount ranging from about 2.159 to about 3.015%;
granular citric acid in an amount ranging from about 0.994 to about 1.358%;
isopropanol in an amount ranging from about 1.351 to about 1.886%;
water, the weight percentages based on the weight of a gallon of water, or 8.3 lbs.

Preferably, the microemulsion has pH is between 6.0 and 8.0 and the surfactant used is sodium lauryl sulfate.

Preferably, all components of the microemulsion are listed on the EPA active and inactive ingredients eligible for minimum risk pesticide products.

The invention also entails a method of cleaning or disinfecting a surface comprising applying the microemulsion to the surface and a method of treating an animal or plants for at least pest control comprising applying an effective amount of the microemulsion to the plants or the animal. One particular application for plant pest control relates to treating citrus plants or trees suffering from citrus greening disease.

The surface can be virtually any surface in need of cleaning or disinfecting and these surfaces include metal, plastic, wood, masonry, composite material, and the like.

The microemulsion can be applied using one or more of brushing, wiping using an implement like a sponge, rag, paper towel, or the like, spraying, and brooming.

In another embodiment for a use of the formulation relates to one or both of suppressing dust and disrupting bioaerosol particles in the air and/or removing them therefrom. This method entails introducing the microemulsion into the air by some dispersing methodology in a desired location and in an effective amount to do one or more of suppress dust contained in the air and remove and/or disrupt bioaerosol particles in the air. The types of locations can be any in need of bioaerosol treatment or dust suppression, including locations inside a structure or outside in the general environment. Structures that may require treatment include those requiring cleanliness and sanitation, e.g., hospitals or other caring facilities, laboratories, areas where dust may be a problem like construction zones and the like.

In a more preferred embodiment, a botanical antimicrobial formulation for use in the applications described above is provided that comprises a clear microemulsion, the microemulsion consisting of thyme oil as an active ingredient in an amount ranging from 0.15 to 0.30 wt. % of the formulation, more preferably 0.195 to 0.276 wt. %, and most preferably around 0.23 wt. % of the total formulation, effective amounts of inactive ingredients, the inactive ingredients selected from the group consisting of an excipient and surfactant for emulsifying and pH adjuster, and an optional additional active that contributes to pest control, with the balance water, all of the components of the formulation, both active and inactive falling under a 25(b) criteria of the EPA.

BRIEF DESCRIPTION OF THE DRAWINGS

FIG. 1 shows line drawing renditions of actual photographs of the inventive microemulsion as compared to other prior art solutions containing thyme oil for purposes of clarity comparisons.

DETAILED DESCRIPTION OF THE INVENTION

The microemulsion composition is formulated as a clear microemulsion and has the proper pH for effective cleaning and anti-bacterial capability.

The Table below shows the components of the formulation, the components CAS number, the range in terms of weight percent and grams for per gallon of water.

| CAS 25B-EPA | 8.3 lb.-128 OZ | percentage/gal water | Range in grams |
|---|---|---|---|
| 8007-46-3 | Thyme oil active | 0.23 to 0.24% | 8.6 g to 9.0 g |
| 77-92-9 | Citric Acid (granular only) | 1.17 to 1.19% | 44 g to 45 g |
| 151-21-3 | SLS* cleaning agent | 2.54 to 2.62% | 96 g to 99 g |
| 68917-75-9 | Wintergreen oil active | 0.15 to .18% | 6 g to 7 g |
| 67-63-0 | Isopropanol (98%) | 1.59 to 1.64 | 60 g to 62 g |

*SLS is sodium lauryl sulfate

The formulation is for the purpose of being a botanical EPA 25(b) antimicrobial cleaner/disinfectant and pesticide for agriculture applications, hospital and home uses, on animals, and general cleaning. Put another way, all of the components of the formula are found in the listing of active and inert or inactive ingredients found in the publications from the Environmental Protection Agency entitled "Active Ingredients Eligible for Minimum Risk Pesticide Products (Updated December 2015)" and "Inert Ingredients Eligible for FIFRA 25(b) Pesticide Products (Revised November 2016)." The publications are publicly available and shown below as Tables 1 and 2. Since the formulation is generally recognized as safe from the standpoint of EPA and FDA, it can be used in the following applications.

25B-40cfr 180.940 a—Food contact surfaces in public eating places, dairy-processing equipment, and food processing equipment and utensils 25B-40cfr 180.960—Any food use site 40cfr 152.25 152.25 Exemptions for pesticides of a character not requiring FIFRA regulation, see 152.25(f).

TABLE 1

Active Ingredients Eligible for Minimum Risk Pesticide Products (Updated December 2015)

| Label Display Name | Chemical Name | CAS No. | Specifications | Nonfood Use | Food Use |
|---|---|---|---|---|---|
| Castor oil | Castor oil | 8001-79-4 | United States Pharmacopeia (U.S.P.) or equivalent | ✓ | ✓ |
| Cedarwood oil | Cedarwood oil (China) | 85085-29-6 | — | ✓ | |
| Cedarwood oil | Cedarwood oil (Texas) | 68990-83-0 | — | ✓ | |
| Cedarwood oil | Cedarwood oil (Virginia) | 8000-27-9 | — | ✓ | |
| Cinnamon | Cinnamon | N/A | — | ✓ | ✓ |
| Cinnamon oil | Cinnamon oil | 8015-91-6 | — | ✓ | ✓ |
| Citric acid | 2-Hydroxypropane-1,2,3-tricarboxylic acid | 77-92-9 | — | ✓ | ✓ |
| Citronella | Citronella | N/A | — | ✓ | |
| Citronella oil | Citronella oil | 8000-29-1 | — | ✓ | |
| Cloves | Cloves | N/A | — | ✓ | ✓ |
| Clove oil | Clove oil | 8000-34-8 | — | ✓ | ✓ |
| Corn gluten meal | Corn gluten meal | 66071-96-3 | — | ✓ | ✓ |
| Corn oil | Corn oil | 8001-30-7 | — | ✓ | ✓ |
| Cornmint | Cornmint | N/A | — | ✓ | ✓ |
| Cornmint oil | Cornmint oil | 68917-18-0 | — | ✓ | ✓ |
| Cottonseecd oil | Cottonseed oil | 8001-29-4 | — | ✓ | ✓ |
| Dried blood | Dried blood | 68911-49-9 | — | ✓ | |
| Eugenol | 4-Allyl-2-metboxyphenol | 97-53-0 | — | ✓ | |
| Garlic | Garlic | N/A | — | ✓ | ✓ |
| Garlic oil | Garlic oil | 8000-78-0 | — | ✓ | ✓ |
| Geraniol | (2E)-3,7-Dimethylocta-2,6-dien-1-ol | 106-24-1 | — | ✓ | ✓ |
| Geranium oil | Geranium oil | 8000-46-2 | — | ✓ | |
| Lauryl sulfate | Lauryl sulfate | 151-41-7 | — | ✓ | ✓ |
| Lemongrass oil | Lemongrass oil | 8007-02.1 | — | ✓ | |
| Linseed oil | Linseed oil | 8001-26-1 | — | ✓ | ✓ |
| Malic acid | 2-Hydroxybutanedioic acid | 6915-15-7 | — | ✓ | |
| Peppermint | Peppermint | N/A | — | ✓ | ✓ |
| Peppermint oil | Peppermint oil | 8006-90-4 | — | ✓ | ✓ |
| 2-Phenylethyl propionate | 2-Phenylethyl propionate | 122-70-3 | — | ✓ | |
| Potassium sorbate | Potassium (2E,4E)-hexa-2,4-dienoate | 24634-61-5 | — | ✓ | ✓ |
| Putrescent whole egg solids | Putrescent whole egg solids | 51609-52-0 | — | ✓ | ✓ |
| Rosemary | Rosemary | N/A | — | ✓ | ✓ |
| Rosemary oil | Rosemary oil | 8000-25-7 | — | ✓ | ✓ |
| Sesame | Sesame | N/A | Includes ground sesame plant | ✓ | ✓ |
| Sesame oil | Sesame oil | 8008-74-0 | — | ✓ | ✓ |
| Sodium chloride | Sodium chloride | 7647-14-5 | — | ✓ | ✓ |
| Sodium lauryl sulfate | Sulfuric acid monododecyl ester, sodium salt | 151-21-3 | — | ✓ | ✓ |
| Soybean oil | Soybean oil | 8001-22-7 | — | ✓ | ✓ |
| Spearmint | Spearmint | N/A | — | ✓ | ✓ |
| Spearmint oil | Spearmint oil | 8008-79-5 | — | ✓ | ✓ |
| Thyme | Thyme | N/A | — | ✓ | ✓ |
| Thyme oil | Thyme oil | 8007-46-3 | — | ✓ | ✓ |
| White pepper | White pepper | N/A | — | ✓ | ✓ |
| Zinc | Zinc | 7440-66-6 | Zinc metal strips (consisting solely of zinc metal and impurities) | ✓ | |

TABLE 1-continued

| If the tolerance exemption appears in . . . | Then the inert ingredient may be included in a minimum risk product that is applied to: |
|---|---|
| 40 CFR180.910 | Growing crops or raw agricultural commodities after harvest. |
| 40 CFR 180.920 | Growing crops |
| 40 CFR 180.930 | Animals |
| 40 CFR 180.940(a) | Food-contact surfaces in public eating places, dairy-processing equipment, and food-processing equipment and utensils |
| 40 CFR 180.940(b) | Dairy-processing equipment, and food-processing equipment and utensils |
| 40 CFR 180.940(c) | Food-processing equipment and utensils |
| 40 CFR 180.950 | Any food-use site |
| 40 CFR 180.960 | Any food-use site |
| 40 CFR 180.1071 | One of the 14 specified use patterns appropriate for peanuts, tree nuts, milk, soybeans, eggs, fish, crustacea, and wheat. |
| 40 CFR 180.1087 | Residues of the biorational nematicide sesame stalk in or on the raw agricultural commodities identified in the tolerance exemption. |
| 40 CFR 180.1233 | Potassium sorbate exemption from the requirement of a tolerance |
| 40 CFR 180.1251 | Geraniol exemption from the requirement of a tolerance |

TABLE 2

Inert Ingredients Eligible for FIFRA 25(b) Pesticide Products
(Revised November 2016)

| Label Display Name | Chemical Name | CAS No. | Nonfood Use | Food Use | Tolerance Exemption Citation 40 180.xxx[1,2] |
|---|---|---|---|---|---|
| Acetyl tributyl citrate | Citric acid, 2-(acetyloxy)-, tributyl ester | 77-90-7 | ✓ | ✓ | 950(e) |
| Agar | Agar | 9002-18-0 | ✓ | | |
| Almond hulls | Almond hulls | N/A | ✓ | ✓ | 950(b) |
| Almond oil | Oils, almond | 8007-69-0 | ✓ | | |
| Almond shells | Almond shells | N/A | ✓ | ✓ | 950(b) |
| alpha-Cyclodextrin | alpha-Cyclodextrin | 10016-20-3 | ✓ | ✓ | 950(e) |
| Aluminatesilicate | Aluminatesilicate | 1327-36-2 | ✓ | | |
| Aluminum magnesium silicate | Silicic acid, aluminum magnesium salt | 1327-43-1 | | | |
| Aluminum potassium sodium silicate | Silicic acid, aluminum potassium | 12736-96-8 | ✓ | | |
| Aluminum silicate | Aluminum silicate | 1335-30-4 | ✓ | | |
| Aluminum sodium silicate | Silicic acid, aluminum sodium salt | 1344-00-9 | ✓ | ✓ | 910 |
| Aluminum sodium silicate | Silicic acid (H4 SiO4), aluminum sodium salt (1:1:1) | 12003-51-9 | ✓ | | |
| Ammonium benzoate | Benzoic acid, ammonium salt | 1863-63-4 | ✓ | | |
| Ammonium stearate | Octadecanoic acid, ammonium salt | 1002-89-7 | ✓ | ✓ | 910 |
| Amylopectin, acid-hydrolyzed, 1-octenylbutanedioate | Amylopectin, acid-hydrolyzed, 1-octenylbutanedioate | 113894-85-2 | ✓ | ✓ | 950(e) |
| Amylopectin, hydrogen 1-octadecenylbutanedioate | Amylopectin, hydrogen 1-octadecenylbutanedioate | 125109-81-1 | ✓ | ✓ | 950(e) |
| Animal glue | Animal glue | N/A | ✓ | ✓ | 950(e) |
| Ascorbyl palmitate | Ascorbyl palmitate | 137-66-6 | ✓ | ✓ | 910, 930 |
| Attapulgite-type clay | Attapulgite-type clay | 12174-11-7 | ✓ | ✓ | 910, 930 |
| Beeswax | Beeswax | 8012-89-3 | ✓ | ✓ | 950(e) |
| Bentonite | Bentonite | 1302-78-9 | ✓ | ✓ | 910 |
| Bentonite, sodian | Bentonite, sodian | 85049-30-5 | ✓ | | |
| beta-Cyclodextrin | beta-Cyclodextrin | 7585-39-9 | ✓ | ✓ | 950(e) |
| Bone meal | Bone meal | 68409-75-6 | ✓ | | |
| Bran | Bran | N/A | ✓ | ✓ | 1071 |
| Bread crumbs | Bread crumbs | N/A | ✓ | ✓ | 1071 |
| (+)-Butyl lactate | Lactic acid, n-butyl ester, (S) | 34451-19-9 | ✓ | ✓ | 950(e) |
| Butyl lactate | Lactic acid, n-butyl ester | 138-22-7 | ✓ | ✓ | 950(e) |
| Butyl stearate | Octadecanoic acid, butyl ester | 123-95-5 | ✓ | ✓ | 950(e) |
| Calcareous shale | Calcareous shale | N/A | ✓ | ✓ | 910 |
| Calcite | Calcite (Ca(CO$_3$)) | 13397-26-7 | ✓ | ✓ | 910, 930 |
| Calcium acetate | Calcium acetate | 62-54-4 | ✓ | | |
| Calcium acetate monohydrate | Acetic acid, calcium salt, monohydrate | 5743-26-0 | ✓ | | |
| Calcium benzoate | Benzoic acid, calcium salt | 2090-05-3 | ✓ | | |
| Calcium carbonate | Calcium carbonate | 471-34-1 | ✓ | ✓ | 910, 930 |
| Calcium citrate | Citric acid, calcium salt | 7693-13-2 | ✓ | ✓ | 950(e) |
| Calcium octanoate | Calcium octanoate | 6107-56-8 | ✓ | ✓ | 910 |
| Calcium oxide silicate | Calcium oxide silicate (Ca$_3$ O(SiO$_4$)) | 12168-85-3 | ✓ | | |

TABLE 2-continued

| Name | Chemical Name | CAS # | ✓ | ✓ | Notes |
|---|---|---|---|---|---|
| Calcium silicate | Silicic acid, calcium salt | 1344-95-2 | ✓ | ✓ | 910, 930 |
| Calcium stearate | Octadecanoic acid, calcium salt | 1592-23-0 | ✓ | ✓ | 910, 930, 940(a), 940(c) |
| Calcium sulfate | Calcium sulfate | 7778-18-9 | ✓ | | |
| Calcium sulfate dihydrate | Calcium sulfate dihydrate | 10101-41-4 | ✓ | | |
| Calcium sulfate hemihydrate | Calcium sulfate hemihydrate | 10034-76-1 | ✓ | | |
| Canary seed | Canary seed | N/A | ✓ | ✓ | 950(b) |
| Carbon | Carbon | 7440-44-0 | ✓ | | |
| Carbon dioxide | Carbon dioxide | 124-38-9 | ✓ | ✓ | 910, 930 |
| Carboxymethyl cellulose | Cellulose, carboxymethyl ether | 9000-11-7 | ✓ | | |
| Cardboard | Cardboard | N/A | ✓ | ✓ | 950(e) |
| Carnauba wax | Carnauba wax | 8015-86-9 | ✓ | ✓ | 950(e) |
| Carob gum | Locust bean gum | 9000-40-2 | ✓ | ✓ | 950(e) |
| Carrageenan | Carrageenan | 9000-07-1 | ✓ | ✓ | 910, 920, 930 |
| Caseins | Caseins | 9000-71-9 | ✓ | | |
| Castor oil | Castor oil | 8001-79-4 | ✓ | ✓ | 950(e) |
| Castor oil, hydrogenated | Castor oil, hydrogenated | 8001-78-3 | ✓ | ✓ | 950(e) |
| Cat food | Cat food | N/A | ✓ | | |
| Cellulose | Cellulose | 9004-34-6 | ✓ | ✓ | 950(e) |
| Cellulose acetate | Cellulose acetate | 9004-35-7 | ✓ | ✓ | 950(e) |
| Cellulose, mixture with cellulose carboxymethyl ether, sodium salt | Cellulose, mixture with cellulose carboxymethyl ether, sodium salt | 51395-75-6 | ✓ | ✓ | 950(e) |
| Cellulose, pulp | Cellulose, pulp | 65996-61-4 | ✓ | ✓ | 950(e) |
| Cellulose, regenerated | Cellulose, regenerated | 68442-85-3 | ✓ | ✓ | 950(e) |
| Cheese | Cheese | N/A | ✓ | ✓ | 950(a) or 1071 |
| Chlorophyll a | Chlorophyll a | 479-61-8 | ✓ | | |
| Chlorophyll b | Chlorophyll b | 519-62-0 | ✓ | | |
| Citric acid | Citric acid | 77-92-9 | ✓ | ✓ | 950(e) |
| Citric acid, monohydrate | Citric acid, monohydrate | 5949-29-1 | ✓ | ✓ | 950(e) |
| Citrus meal | Citrus meal | N/A | ✓ | ✓ | 950 |
| Citrus pectin | Citrus pectin | 9000-69-5 | ✓ | | |
| Citrus pulp | Citrus pulp | 68514-76-1 | ✓ | ✓ | 950(b) |
| Clam shells | Clam shells | N/A | ✓ | | |
| Cocoa | Cocoa | 8002-31-1 | ✓ | ✓ | 950(a) |
| Cocoa shell flour | Cocoa shell flour | N/A | ✓ | | |
| Cocoa shells | Cocoa shells | N/A | ✓ | ✓ | 950(b) |
| Cod-liver oil | Cod-liver oil | 8001-69-2 | ✓ | ✓ | 910 |
| Coffee grounds | Coffee grounds | 68916-18-7 | ✓ | ✓ | 950(e) |
| Cookies | Cookies | N/A | ✓ | ✓ | 950 or 1071 |
| Cork | Cork | 61789-98-8 | ✓ | | |
| Corn cobs | Corn cobs | N/A | ✓ | ✓ | 950(b) |
| Cotton | Cotton | N/A | ✓ | | |
| Cottonseed meal | Cottonseed meal | 68424-10-2 | ✓ | | |
| Cracked wheat | Cracked wheat | N/A | ✓ | ✓ | 1071 |
| Decanoic acid, monoester with 1,2,3-propanetriol | Decanoic acid, monoester with 1,2,3-propanetriol | 26402-22-2 | ✓ | ✓ | 910 |
| Dextrins | Dextrins | 9004-53-9 | ✓ | ✓ | 950(e) |
| Diglyceryl monooleate | 9-Octadecenoic acid, ester with 1,2,3-propanetriol | 49553-76-6 | ✓ | ✓ | 910 |
| Diglyceryl monostearate | 9-Octadecanoic acid, monoester with oxybis(propanediol) | 12694-22-3 | ✓ | ✓ | 910 |
| Dilaurin | Dodecanoic acid, diester with 1,2,3- propanetriol | 27638-00-2 | ✓ | ✓ | 910 |
| Dipalmitin | Hexadecanoic acid, diester with 1,2,3-propanetriol | 26657-95-4 | ✓ | ✓ | 910 |
| Dipotassium citrate | Citric acid, dipotassium salt | 3609-96-9 | ✓ | ✓ | 950(e) |
| Disodium citrate | Citric acid, disodium salt | 144-33-2 | ✓ | ✓ | 950(e) |
| Disodium sulfate | Disodium sulfate decahydrate | 7727-73-3 | ✓ | | |
| Diatomaceous earth | Kieselguhr; Diatomite (less than 1% crystalline silica) | 61790-53-2 | ✓ | ✓ | 910, 930, 1017 |
| Dodecanoic acid, monoester with 1,2,3-propanetriol | Dodecanoic acid, monoester with 1,2,3-propanetriol | 27215-38-9 | ✓ | ✓ | 910 |
| Dolomite | Dolomite | 16389-88-1 | ✓ | ✓ | 910 |
| Douglas fir bark | Douglas fir bark | N/A | ✓ | ✓ | 920 |
| Egg shells | Egg shells | N/A | ✓ | | |
| Eggs | Eggs | N/A | ✓ | ✓ | 1071 |
| (+)-Ethyl lactate | Lactic acid, ethyl ester, (S) | 687-47-8 | ✓ | ✓ | 950(e) |
| Ethyl lactate | Lactic acid, ethyl ester | 97-64-3 | ✓ | ✓ | 950(e) |
| Feldspar | Feldspar | 68476-25-5 | ✓ | | |
| Ferric oxide | Iron oxide ($Fe_2O_3$) | 1309-37-1 | ✓ | ✓ | 910, 930 |
| Ferrous oxide | Iron oxide (FeO) | 1345-25-1 | ✓ | ✓ | 950(b) |
| Fish meal | Fish meal | N/A | ✓ | ✓ | 1071 |
| Fish oil | Fish oil | 8016-13-5 | ✓ | | |
| Fuller's earth | Fuller's earth | 8031-18-3 | ✓ | ✓ | 910 |
| Fumaric acid | Fumaric acid | 110-17-8 | ✓ | ✓ | 950(e) |
| gamma-Cyclodextrin | gamma-Cyclodextrin | 17465-86-0 | ✓ | ✓ | 950(e) |
| Gelatins | Gelatins | 9000-70-8 | ✓ | ✓ | 950(a) |

TABLE 2-continued

| Name | Chemical name | CAS | | | Code |
|---|---|---|---|---|---|
| Gellan gum | Gellan gum | 71010-52-1 | ✓ | ✓ | 950(e) |
| Glue | Glue (at depolyrnd. animal collagen) | 68476-37-9 | ✓ | | |
| Glycerin | 1,2,3-Propanetriol | 56-81-5 | ✓ | ✓ | 950(e) |
| Glycerol monooleate | 9-Octadecenoic acid (Z)-, 2,3-dihydroxypropyl ester | 111-03-5 | ✓ | ✓ | 910 |
| Glyceryl dicaprylate | Octanoic acid, diester with 1,2,3-propanetriol | 36354-80-0 | ✓ | ✓ | 910 |
| Glyceryl dimyristate | Tetradecanoic acid, diester with 1,2,3-propanetriol | 53563-63-6 | ✓ | ✓ | 910 |
| Glyceryl dioleate | 9-Octadecenoic acid (9Z)-, diester with 1,2,3-pmpanetriol | 25637-84-7 | ✓ | ✓ | 910 |
| Glyceryl distearate | Octadecanoic acid, diester with 1,2,3-propanetriol | 1323-83-7 | ✓ | ✓ | 910 |
| Glyceryl monomyristate | Tetradecanoic acid, monoester with 1,2,3-propanetriol | 27214-38-6 | ✓ | ✓ | 910 |
| Glyceryl monooctanoate | Octanoic acid, monoester with 1,2,3-propanetriol | 26402-26-6 | ✓ | ✓ | 910 |
| Glyceryl monooleate | 9-Octadecenoic acid (9Z)-, monoester with 1,2,3-propanetriol | 25496-72-4 | ✓ | ✓ | 910, 930 |
| Glyceryl monostearate | Octadecanoic acid, monoester with 1,2,3-propanetriol | 31566-31-1 | ✓ | ✓ | 910, 930 |
| Glyceryl stearate | Octadecanoic acid, ester with 1,2,3-propanetriol | 11099-07-3 | ✓ | ✓ | 910 |
| Granite | Granite | N/A | ✓ | ✓ | 910 |
| Graphite | Graphite | 7782-42-5 | ✓ | ✓ | 910 |
| Guar gum | Guar gum | 9000-30-0 | ✓ | ✓ | 950(e) |
| Gum Arabic | Gum arabic | 9000-01-5 | ✓ | ✓ | 910 |
| Gum tragacanth | Gum tragacanth | 9000-65-1 | ✓ | | |
| Gypsum | Gypsum | 13397-24-5 | ✓ | ✓ | 910, 930 |
| Hematite | Hematite ($Fe_2O_3$) | 1317-60-8 | ✓ | | |
| Humic acid | Humic acid | 1415-93-6 | ✓ | ✓ | 950(e) |
| Hydrogenated | Hydrogenated cottonseed oil | 68334-00-9 | ✓ | ✓ | 950(c) |
| Hydrogenated rapeseed | Hydrogenated rapeseed oil | 84681-71-0 | ✓ | ✓ | 950(c) |
| Hydrogenated soybean | Hydrogenated soybean oil | 8016-70-4 | ✓ | ✓ | 950(c) |
| Hydroxyethyl cellulose | Cellulose, 2-hydroxyethyl ether | 9004-62-0 | ✓ | ✓ | 950(e) |
| Hydroxypropyl cellulose | Cellulose, 2-hydroxypropyl ether | 9004-64-2 | ✓ | ✓ | 950(e) |
| Hydroxypropyl methyl cellulose | Cellulose, 2-hydroxypropyl methyl ether | 9004-65-3 | ✓ | ✓ | 950(e) |
| Iron magnesium oxide | Iron magnesium oxide ($Fe_2MgO_4$) | 12068-86-9 | ✓ | | |
| Iron oxide, hydrate | Iron oxide ($Fe_2O_3$), hydrate | 12259-21-1 | ✓ | ✓ | 910 |
| Iron oxide | Iron oxide ($Fe_3O_4$) | 1317-61-9 | ✓ | ✓ | 910 |
| Isopropyl alcohol | 2-Propanol | 67-63-0 | ✓ | ✓ | 950(e) |
| Isopropyl myristate | Isopropyl myrisiate | 110-27-0 | ✓ | ✓ | 910, 930 |
| Kaolin | Kaolin | 1332-58-7 | ✓ | ✓ | 910, 930, 1180 |
| Lactose | Lactose | 63-42-3 | ✓ | ✓ | 950(a) |
| Lactose monohydrate | Lactose monohydrate | 64044-51-5 | ✓ | ✓ | 950(a) |
| Lanolin | Lanolin | 8006-54-0 | ✓ | ✓ | 950(e) |
| Latex rubber | Latex rubber | N/A | ✓ | | |
| Lauric acid | Lauric acid | 143-07-7 | ✓ | ✓ | 950(e) |
| Lecithins | Lecithins | 8002-43-5 | ✓ | ✓ | 950(e) |
| Licorice extract | Licorice extract | 68916-91-6 | ✓ | ✓ | 950(e) |
| Lime dolomitic | Lime (chemical) dolomitic | 12001-27-3 | ✓ | ✓ | 910 |
| Limestone | Limestone | 1317-65-3 | ✓ | ✓ | 910, 930 |
| Linseed oil | Linseed oil | 8001-26-1 | ✓ | ✓ | 950(c) |
| Magnesium carbonate | Carbonic acid, magnesium salt (1:1) | 546-93-0 | ✓ | ✓ | 910, 930 |
| Magnesium benzoate | Magnesium benzoate | 553-70-8 | ✓ | | |
| Magnesium oxide | Magnesium oxide | 1309-48-4 | ✓ | ✓ | 910, 940a, 940c |
| Magnesium oxide silicate | Magnesium oxide silicate | 12207-97-5 | ✓ | ✓ | 9 |
| Magnesium silicate | Magnesium silicate | 1343-88-0 | ✓ | ✓ | 910 |
| Magnesium silicate hydrate | Magnesium silicate hydrate | 1343-90-4 | ✓ | ✓ | 910, 930 |
| Magnesium silicon | Magnesium silicon oxide | 14987-04-3 | ✓ | ✓ | |
| Magnesium stearate | Octadecanoic acid, magnesium salt | 557-04-0 | ✓ | ✓ | 910 |
| Magnesium sulfate | Magnesium sulfate | 7487-88-9 | ✓ | ✓ | 910 |
| Magnesium sulfate heptahydrate | Magnesium sulfate heptahydrate | 10034-99-8 | ✓ | ✓ | 910 |
| Malic acid | Malic acid | 6915-15-7 | ✓ | | |
| Malt extract | Malt extract | 8002-48-0 | ✓ | ✓ | 950(a) |
| Malt flavor | Malt flavor | N/A | ✓ | ✓ | 950(a) |
| Maltodextrin | Maltodextrin | 9050-36-6 | ✓ | ✓ | 950(e) |
| Methylcellulose | Cellulose, methyl ether | 9004-67-5 | ✓ | ✓ | 950(e) |
| Mica | Mica | 12003-38-2 | ✓ | ✓ | 910 |
| Mica-group minerals | Mica-group minerals | 12001-26-2 | ✓ | | |
| Milk | Milk | 8049-98-7 | ✓ | ✓ | 1071 |
| Millet seed | Millet seed | N/A | ✓ | ✓ | 950(a) |
| Mineral oil | Mineral oil (U.S.P.) | 8012-95-1 | ✓ | ✓ | 910, 930 |
| 1-Monolaurin | Dodecanoic acid, 2,3-dihydroxypropyl ester | 142-18-7 | ✓ | ✓ | 910 |
| 1-Monomyristin | Tetradecanoic acid, 2,3-dihydroxypropyl ester | 589-68-4 | ✓ | ✓ | 910 |

TABLE 2-continued

| | | | | | |
|---|---|---|---|---|---|
| Monomyristin | Decanoic acid, diester with 1,2,3-propanetriol | 53998-07-1 | ✓ | | |
| Monopalmtin | Hexadecanoic acid, monoester with 1,2,3-propanetriol | 26657-96-5 | ✓ | ✓ | 910 |
| Monopotassium citrate | Citric acid, monopotassium salt | 866-83-1 | ✓ | ✓ | 950(e) |
| Monosodium citrate | Citric acid, monosodium salt | 18996-35-5 | ✓ | ✓ | 950(e) |
| Montmorillonite | Montmorillonite | 1318-93-0 | ✓ | ✓ | 910, 930 |
| Myristic acid | Myristic acid | 544-63-8 | ✓ | ✓ | 910 |
| Nepheline syenite | Nepheline syenite | 37244-96-5 | ✓ | | |
| Nitrogen | Nitrogen | 7727-37-9 | ✓ | | |
| Nutria meat | Nutria meat | N/A | ✓ | | |
| Nylon | Nylon | N/A | ✓ | | |
| Octanoic acid, potassium salt | Octanoic acid, potassium salt | 764-71-6 | ✓ | ✓ | 910 |
| Octanoic acid, sodium salt | Octanoic acid, sodium salt | 1984-06-1 | ✓ | ✓ | 910 |
| Oleic acid | Oleic acid | 112-80-1 | ✓ | ✓ | 910, 930 |
| Oyster shells | Oyster shells | N/A | ✓ | | |
| Palm oil | Palm oil | 8002-75-3 | ✓ | ✓ | 950(c) |
| Palm oil, hydrogenated | Palm oil, hydrogenated | 68514-74-9 | ✓ | ✓ | 950(c) |
| Palmitic acid | Hexadecanoic acid | 57-10-3 | ✓ | ✓ | 910 |
| Paper | Paper | N/A | ✓ | ✓ | 950(e) |
| Paraffin wax | Paraffin wax | 8002-74-2 | ✓ | | |
| Peanut butter | Peanut butter | N/A | ✓ | ✓ | 1071 |
| Peanut shells | Peanut shells | N/A | ✓ | ✓ | 950(b) |
| Peanuts | Peanuts | N/A | ✓ | ✓ | 1071 |
| Peat moss | Peat moss | N/A | ✓ | | |
| Pectin | Pectin | 9000-69-5 | ✓ | | |
| Perlite | Perlite | 130885-09-5 | ✓ | | |
| Perlite, expanded | Perlite, expanded | 93763-70-3 | ✓ | | |
| Plaster of paris | Plaster of paris | 26499-65-0 | ✓ | | |
| Polyethylene | Polyethylene | 9002-88-4 | ✓ | ✓ | 910 930 |
| Polyglyceryl oleate | Polyglyceryl oleate | 9007-48-1 | ✓ | ✓ | 910 |
| Polyglyceryl stearate | Polyglyceryl stearate | 9009-32-9 | ✓ | ✓ | 910, 930 |
| Potassium acetate | Acetic acid, potassium salt | 127-08-2 | ✓ | | |
| Potassium aluminum silicate, anhydrous | Potassium aluminum silicate, anhydrous | 1327-44-2 | ✓ | ✓ | 910 |
| Potassium benzoate | Benzoic acid, potassium salt | 582-25-2 | ✓ | | |
| Potassium bicarbonate | Carbonic acid, monopotassium salt | 298-14-6 | ✓ | ✓ | 950(e) |
| Potassium chloride | Potassium chloride | 7447-40-7 | ✓ | ✓ | 950(e) |
| Potassium citrate | Citric acid, potassium salt | 7778-49-6 | ✓ | ✓ | 950(e) |
| Potassium humate | Humic acids, potassium salts | 68514-28-3 | ✓ | ✓ | 950(e) |
| Potassium myristate | Tetradecanoic acid, potassium salt | 13429-27-1 | ✓ | ✓ | 910 |
| Potassium oleate | 9-Octadecenoic acid (9Z)-, potassium | 143-18-0 | ✓ | ✓ | 910 |
| Potassium ricinoleate | 9-Octadecenoic acid, 12-hydroxy-, monopotassium salt, (9Z, 12R)- | 7492-30-0 | ✓ | | |
| Potassium sorbate | Sorbic acid, potassium salt | 24634-61-5 | ✓ | ✓ | 950(e) |
| Potassium stearate | Octadecanoic acid, potassium salt | 593-29-3 | ✓ | ✓ | 1068 |
| Potassium sulfate | Potassium sulfate | 7778-80-5 | ✓ | ✓ | 910 |
| Potassium sulfate | Sulfuric acid, monopotassium salt | 7646-93-7 | ✓ | | |
| 1,2-Propylene carbonate | 1,3-Dioxolan-2-one, 4-methyl- | 108-32-7 | ✓ | ✓ | 950(e) |
| Pumice | Pumice | 1332-09-8 | ✓ | | |
| Red cabbage color | Red cabbage color (expressed from edible red cabbage heads via a pressing process using only acidified water) | N/A | ✓ | ✓ | 950(e) |
| Red cedar chips | Red cedar chips | N/A | ✓ | | |
| Red dog flour | Red dog flour | N/A | ✓ | | |
| Rubber | Rubber | 9006-04-6 | ✓ | | |
| Sawdust | Sawdust | N/A | ✓ | | |
| Shale | Shale | N/A | ✓ | | |
| Silica, amorphous, fumed | Silica, amorphous, fumed (crystalline free) | 112945-52-5 | ✓ | ✓ | 950(e) |
| Silica, amorphous, precipitate and gel | Silica, amorphous, precipitate and gel | 7699-41-4 | ✓ | ✓ | 950(e) |
| Silica | Silica (crystalline free) | 7631-86-9 | ✓ | ✓ | |
| Silica gel | Silica gel | 63231-67-4 | ✓ | ✓ | 950(e) |
| Silica gel, precipitated, crystalline-free | Silica gel, precipitated, crystalline-free | 112926-00-8 | ✓ | ✓ | 950(e) |
| Silica, hydrate | Silica, hydrate | 10279-57-9 | ✓ | ✓ | 950(e) |
| Silica, vitreous | Silica, vitreous | 60676-86-0 | ✓ | ✓ | 950(e) |
| Silicic acid, magnesium salt | Silicic acid ($H_2SiO_3$), magnesium salt | 13776-74-4 | ✓ | ✓ | 910, 930 |
| Soap | Soap (The water soluble sodium or potassium salts of fatty acids produced by either the saponification of fats and oils, or the neutralization of fatty acid) | N/A | ✓ | ✓ | 950(e) |
| Soapbark | Quillaja saponin | 1393-03-9 | ✓ | ✓ | 950(e) |
| Soapstone | Soapstone | 308076-02-0 | ✓ | ✓ | 910, 930 |
| Sodium acetate | Acetic acid, sodium salt | 127-09-3 | ✓ | ✓ | 950(e) |

TABLE 2-continued

| | | | | | |
|---|---|---|---|---|---|
| Sodium alginate | Sodium alginate | 9005-38-3 | ✓ | ✓ | 950(e) |
| Sodium benzoate | Benzoic acid, sodium salt | 532-32-1 | ✓ | ✓ | 950(e) |
| Sodium bicarbonate | Sodium bicarbonate | 144-55-8 | ✓ | ✓ | 950(e) |
| Sodium carboxymethyl cellulose | Cellulose, carboxymethyl ether, sodium | 9004-32-4 | ✓ | ✓ | 950(e) |
| Sodium chloride | Sodium chloride | 7647-14-5 | ✓ | ✓ | 950(e) |
| Sodium citrate | Sodium citrate | 994-36-5 | ✓ | ✓ | 950(e) |
| Sodium humate | Humic acids, sodium salts | 68131-04-4 | ✓ | ✓ | 950(e) |
| Sodium oleate | Sodium oleate | 143-19-1 | ✓ | ✓ | 910 |
| Sodium ricinoleate | 9-Octadecenoic acid, 12-hydroxy-, monosodium salt, (9Z, 12R)- | 5323-95-5 | ✓ | | |
| Sodium stearate | Octadecanoic acid, sodium salt | 822-16-2 | ✓ | ✓ | 910 |
| Sodium sulfate | Sodium sulfate | 7757-82-6 | ✓ | ✓ | 910, 930 |
| Sorbitol | D-glucitol | 50-70-4 | ✓ | ✓ | 950(e) |
| Soy protein | Soy protein | N/A | ✓ | | |
| Soya lecithins | Lecithins, soya | 8030-76-0 | ✓ | ✓ | 950(e) |
| Soybean hulls | Soybean hulls | N/A | ✓ | ✓ | 950(b) |
| Soybean meal | Soybean meal | 68308-36-1 | ✓ | ✓ | 1071 |
| Soybean, flour | Soybean, flour | 68513-95-1 | ✓ | ✓ | 1071 |
| Stearic acid | Octadecanoic acid | 57-11-4 | ✓ | ✓ | 910, 930 |
| Sulfur | Sulfur | 7704-34-9 | ✓ | | |
| Syrups, hydrolyzed starch, hydrogenated | Syrups, hydrolyzed starch, hydrogenated | 68425-17-2 | ✓ | ✓ | 950(e) |
| Tetraglyceryl monooleate | 9-Octadecenoic acid (9Z)-, monoester with tetraglycero | 71012-10-7 | ✓ | | |
| Tricalcium citrate | Citric acid, calcium salt (2:3) | 813-94-5 | ✓ | ✓ | 950(e) |
| Triethyl citrate | Citric acid, triethyl ester | 77-93-0 | ✓ | ✓ | 950(e) |
| Tripotassium citrate | Citric acid, tripotassium salt | 866-84-2 | ✓ | ✓ | 950(e) |
| Tripotassium citrate monohydrate | Citric acid, tripotassium salt, monohydrate | 6100-05-6 | ✓ | ✓ | 950(e) |
| Trisodium citrate | Citric acid, trisodium salt | 68-04-2 | ✓ | ✓ | 950(e) |
| Trisodium citrate dehydrate | Citric acid, trisodium salt, dehydrate | 6132-04-3 | ✓ | ✓ | 950(e) |
| Trisodium citrate pentahydrate | Citric acid, trisodium salt, pentahydrate | 6858-44-2 | ✓ | ✓ | 950(e) |
| Ultramarine blue | C.I. Pigment Blue 29 | 57455-37-5 | ✓ | ✓ | 950(e) |
| Urea | Urea | 57-13-6 | ✓ | ✓ | 950(e) |
| Vanillin | Benzaldehyde, 4-hydroxy-3-methoxy- | 121-33-5 | ✓ | ✓ | 950(e) |
| Vermiculite | Vermiculite | 1318-00-9 | ✓ | ✓ | 910 |
| Vinegar | Vinegar (maximum 8% acetic acid in solution) | 8028-52-2 | ✓ | ✓ | 950(a) |
| Vitamin C | L-Ascorbic acid | 50-81-7 | ✓ | ✓ | 950(e) |
| Vitamin E | Vitamin E | 1406-18-4 | ✓ | ✓ | 910 |
| Walnut flour | Walnut flour | N/A | ✓ | | |
| Walnut shells | Walnut shells | N/A | ✓ | ✓ | 1071 |
| Wheat | Wheat | N/A | ✓ | ✓ | 1071 |
| Wheat flour | Wheat flour | N/A | ✓ | ✓ | 1071 |
| Wheat germ oil | Wheat germ oil | 8006-95-9 | ✓ | ✓ | 950(c) |
| Wheat oil | Oils, wheat | 68917-73-7 | ✓ | ✓ | 1071 |
| Whey | Whey | 92129-90-3 | ✓ | ✓ | 1071 |
| White mineral oil | White mineral oil (petroleum) | 8042-47-5 | ✓ | ✓ | 910, 930 |
| Wintergreen oil | Wintergreen oil | 68917-75-9 | ✓ | | |
| Wollastonite | Wollastonite (Ca(SiO$_3$)) | 13983-17-0 | ✓ | | |
| Wool | Wool | N/A | ✓ | | |
| Xanthan gum | Xanthan gum | 11138-66-2 | ✓ | ✓ | 950(e) |
| Yeast | Yeast | 68876-77-7 | ✓ | ✓ | 950(a) |
| Zeolites | Zeolites (excluding erionite (CAS Reg. No. 66733-21-9)) | 1318-02-1 | ✓ | ✓ | 910 |
| Zeolites, NaA | Zeolites, NaA | 68989-22-0 | ✓ | | |
| Zinc iron oxide | Zinc iron oxide | 12063-19-3 | ✓ | | |
| Zinc oxide | Zinc oxide (ZnO) | 1314-13-2 | ✓ | ✓ | 910, 930 |
| Zinc stearate | Octadecanoic acid, zinc salt | 557-05-1 | ✓ | ✓ | 920, 930 |

| If the tolerance exemption appears in . . . | Then the inert ingredient may be included in a minimum risk product that is applied to: |
|---|---|
| 40 CFR180.910 | Growing crops or raw agricultural commodities after harvest |
| 40 CFR 180.920 | Growing crops |
| 40 CFR 180.930 | Animals |
| 40 CFR 180.940(a) | Food-contact surfaces in public eating places, dairy-processing equipment, and food-processing equipment and utensils |
| 40 CFR 180.940(b) | Dairy-processing equipment, and food-processing equipment and utensils |
| 40 CFR 180.940(c) | Food-processing equipment and utensils |
| 40 CFR 180.950 | Any food-use site |
| 40 CFR 180.960 | Any food-use site |
| 40 CFR 180.1071 | One of the 14 specified use patterns appropriate for peanuts, tree nuts, milk, soybeans, eggs, fish, crustacea, and wheat. |

The microemulsion is advantageous in that it says in solution and does not require constant or intermittent mixing or shaking.

The microemulsion also does not employ any heavy metals or thyme oil derived from a petroleum product.

The formulation can also include fresh mint, lemon grass, anise or another other oil that falls under the EPA 25(b) designation to impart an odor is desired.

The microemulsion can be applied as a solution based on the above proportions or it can be further diluted for a particular application.

The microemulsion is also biodegradable and is suitable for use on glass, stainless steel, stone, wood, as a mold cleaner on porous and non-porous surfaces, and on animals to discourage pests on plants to help prevent molds and pests.

The following Table 3 shows the ingredients of a preferred formulation in terms of the ingredients intended uses.

TABLE 1

| Item | CAS | Category and function |
|---|---|---|
| Citric Acid from dissolved food grade granules | 77-92-9 25(b) | Anti-microbial for mold control and pH adjustment |
| Isopropanol (98%) | 67-63-0 25(b) | excipient |
| thyme | 8007-46-3 25(b) | Active ingredient/pest control |
| Wintergreen | 68917-75-9 25(b) | Pest control |
| SLS | 151-21-3 25(b) | surfactant |
| Miscellaneous | | |
| Water | 7732-18-5 | distilled or potable |
| pH range | | 6-8 pH |
| color | | clear to light amber |
| Clarity (FTU) | | 1.5 to 4.0. |

Shown below is another rendition of a preferred formulation of the invention entitled as follows: BAC (FIFRA 25b) Botanical Antimicrobial Cleaner (BAC), disinfectant, and pesticide for agriculture and hospitals, homes, animal, cleaning and more (FIFRA 25b)

TABLE 2

| | 128 ounces or 3764.8 grams 8.3 to 8.4 pounds | | |
|---|---|---|---|
| | CAS number and functionality | weight | Weight percentage range |
| Citric Acid from granular only Dissolve in warm water | 77-92-9 Antimicrobial for mold control | 44 grams to 45 grams .097 lb. | 1.17% to 1.19% |
| Thyme oil | 8007-46-3 Active | 8.6 gram to 9 grams .0189 lb. | .23% to .24% |
| IP 98% | 67-63-0 Excipient | 60 grams to 62 grams .132 lb. or 2.11 ounces | 1.59% to 1.64% |
| Wintergreen | 68917-75-9 Pest control | 6 grams to 7 grams .0132 lb. | .15% to .18% |
| SLS | 151-21-3 surfactant | 96 grams to 99 grams 3.2 ounces .211 lb. | 2.54% to 2.62% |
| Water | 7732-18-5 | 3550 grams | 95.91% to 94.13% |

. . . Applicable regulations include 40 CFR 180.940(a), 40 CFR 152.25(f), 40 CFR 180.960.

25(b) Active @.23% CAS Number 8007-46-3 white thyme oil (whole plant).

Stays in solution no mixing or shaking, no heavy metals, no petroleum based thyme oil.

USDA certified organic wintergreen oil ingredient (whole plant) Fresh mint or lemon grass or anise or any 25 (b) essential oil for odor.

Antimicrobial cleaner disinfectant.

(GRAS) Generally recognized as Safe (GRAS) - FIFRA 25B Active 40 CFR 152.25(f)(1) 0.23 wt. percent white thyme oil as one active ingredient.

40 CFR 180.940(a), 40 CFR 152.25(f), 40 CFR 180.960, 40 CFR 152.25(f). Any food use site, food processing, remediation, dairies, animals, equipment.

Bio-degradable, mold cleaner, glass, stainless, wood, stone.

Can be applied to growing crops and harvested crops as a disinfectant and pesticide that can be a dilute product or a ready to use and is FIFRA 25(b) compliant and a disinfectant.

The microemulsion is a clear, thermodynamically stable, isotropic liquid mixtures of oil, water and one or more surfactants. The aqueous phase may contain salt(s) and/or other ingredients, and the oil may actually be a complex mixture of different hydrocarbons and olefins. Microemulsions are contrasted with emulsions in that microemulsions form upon simple mixing of the components and do not require high shear conditions generally used in the formation of ordinary emulsions. The three basic types of microemulsions are direct (oil dispersed in water, o/w), reversed (water dispersed in oil, w/o) and bicontinuous.

In ternary systems such as microemulsions, where two immiscible phases (water and oil) are present with a surfactant, the surfactant molecules may form a monolayer at the interface between the oil and water, with the hydrophobic tails of the surfactant molecules dissolved in the oil phase and the hydrophilic head groups in the aqueous phase.

Examples of surfaces that can be cleaned with the formulation include any hard surface in need of cleaning, for example, walls, floors, ceiling, countertops, fixtures, sidings, vehicles, metals, plastics of any kind, woods, composites, and the like. Virtually any hard surface in need of cleaning, and/or mold or bacteria reduction or elimination is a candidate for use with the inventive formulation.

Again, the formulation has a number of advantages over other thyme-based cleaning products. First, the microemulsion is a very clear product as evidenced by its formazin turbidity unit (FTU) of 1.5 to 4.0. Other thyme-based cleaning products do not have such clarity, see for example, the discussion below regarding clarity of the inventive microemulsion as compared to other prior art products as shown in the sole FIGURE.

Second, as the formulation only uses 25(b) components, it is an all-natural product. Other thyme-based products have non-25(b) components, e.g., copper sulfate, or the thyme is not naturally based (it is derived from a petroleum product), and these kinds of products cannot be characterized as a 25(b) formulation.

As the formulation is a totally natural 25(b) product, it also has applications for plants, growing crops, animals, food contact surfaces, dairy processing equipment, food processing equipment, any food use site, see 40 CFR 180.940(a)/960 and 40 CFR 152.25(f).

It should be understood that the percentages of the various components can range from 15%, more preferably 10% below and above the preferred precise formulation noted in the Tables above. The active ingredients of the microemulsion formulation are readily available using their CAS number.

For example, for the active ingredient, the thyme oil percentage could range from about 0.195 to about 0.276% and more preferably from about 0.207 to about 0.264%. Thyme oil is generally recognized as safe (GRAS) and is listed in 40 CFR 152.25(f).

The wintergreen oil could range from about 0.128 to about 0.207%, and more preferably from about 0.135 to about 0.198%.

The SLS surfactant could range from about 2.159 to about 3.013%, and more preferably from about 2.286 to about 2.882%.

As noted above, thyme and wintergreen oils are active ingredients providing anti-fungal/anti-microbial functions/pest control.

While SLS is disclosed as a preferred surfactant for use in the microemulsion, other surfactants similar to SLS can be used that satisfy the 25(b) criteria of the Environmental Protection Agency, which is attached herewith both for active and inactive ingredients.

For the inactive or inert ingredients, the citric acid could range from about 0.994 to about 1.358% and more preferably from about 1.053 to about 1.309%. The citric acid also can function as an antimicrobial for mold control. The citric acid is provided as citric acid anhydrous fine granules, which are readily available commercially. The granules are dissolved in warm water when making the microemulsion.

The purpose of the isopropanol is for microemulsification and the preferred concentration is 98% but other concentrations could be used. The isopropanol can range from about 1.351 to about 1.886% and more preferably from about 1.431 to about 1.804%. The pH of the formulation should be adjusted to between 6.0 and 8.0. The pH is controlled by the addition of the citric acid. Citric acid is a weak organic acid that has the chemical formula $C_6H_8O_7$. It occurs naturally in citrus fruits. In biochemistry, it is an intermediate in the citric acid cycle, which occurs in the metabolism of all aerobic organisms.

More than a million tons of citric acid are manufactured every year. It is used widely as an acidifier, as a flavoring and a chelating agent.

A citrate is a derivative of citric acid; that is, the salts, esters, and polyatomic anion found in solution. An example of the former, a salt is trisodium citrate; an ester is triethyl citrate. When part of a salt, the formula of the citrate ion is written as $C_6H_5O^{3-}_7$ or $C_3H_5O(COO)^{3-}_3$. Citric acid is widely used as an acidulant in creams, gels, and liquids of all kinds. In its use in foods and dietary supplements, it may be classified as a processing aid if the purpose it was added was for a technical or functional effect (e.g. acidulant, chelator, viscosifier, etc. . . . ) for a process. If it is still present in insignificant amounts, and the technical or functional effect is no longer present, and can be exempted from labeling <21 CFR § 101.100(c)>. Although granular citric acid is a preferred component for mold control and pH adjustment, another or additional 25(b) pH adjuster and/or mold control agent can be employed as would be known in the art to obtained the desired end range for the pH.

The thyme oil or Thymus vulgaris is made up of a number of micro-constituents. The following table lists the breakdown of micro-constituents contained in the thyme oil used in the formulation in terms micro-constituent %.

| | |
|---|---|
| α- thujene 2.84 | thymol methyl ether 1.78 |
| α-pinene 2.97 | thymol 46.21 |
| β-pinene 0.71 | carvacrol 2.44 |
| octan-1-en-3-ol 0.48 | terpinyl acetate 0.68 |
| myrcene 3.45 | eugenol 0.1 |
| α-phellandrene 0.42 | β-bourbonene 0.09 |
| α -terpinene 2.69 | β-elemene 0.14 |
| p-cymene 9.91 | methyl eugenol 0.21 |
| limonene 1.23 | β-caryophyllene 1.64 |
| 1,8-cineole 1.96 | β-copaene 0.16 |
| γ-terpinene 14.08 | α-humulene 0.17 |
| cis-sabinen hydrate 0.19 | germacrene D 0.4 |
| terpinolene 0.13 | β-bisabolene 0.33 |
| linalool 3.99 | 27.331 1520 δ-cadinene 0.14 |
| terpinene-4-ol 0.25 | 28.897 1581 caryophyllene oxide 0.21 |

As the formulation is a food grade formulation, all components should be of food grade quality.

Applications of the microemulsion on surfaces are believed to provide anti-bacterial efficacy comparable to thyme oil-based cleaners presently on the market.

In applying the microemulsion formulation for cleaning purposes, any kind of an application can be used. Examples include spraying, brushing, using rags, paper towels, and the like. Different kinds of applications could be combined as well. In fact, the formulation can be applied in virtually any way for cleaning and disinfecting a desired surface, whether the surface is large or small.

The formulation is especially useful for treating plants and a preferred method of application is spraying. The microemulsion can be applied to growing crops and harvested crops as a disinfectant and pesticide, either in a concentration according to one or more of the formulations described herein or in a more diluted form. For example, a formulation according to Tables above could be further diluted with distilled or deionized water for application. Typical dilution rates would be 1 part formulation to 10 parts water or 1 part formulation to 100 parts water. These dilution rates are only examples and other dilution rates could be used, e.g., 1:5, 1:20, 1:25, 1:50, and the like.

Another example of the formulation for a gallon of water would be the following.

| CAS 25B-EPA | 8.3 lb.-128 OZ | percentage/gal water | Range in grams |
|---|---|---|---|
| 8007-46-3 | Thyme oil active | 2.2 to 2.4% | 86 g to 90 g |
| 77-92-9 | Citric Acid (from dissolved granular only) | 11.7 to 11.9% | 440 g to 450 g |
| 151-21-3 | SLS* cleaning agent | 25.4 to 26.2% | 960 g to 990 g |
| 68917-75-9 | Wintergreen oil | 1.5 to 1.8% | 60 g to 70 g |
| 67-63-0 | Isopropanol (98%) | 15.90 to 16.40 | 600 g to 620 g |

*SLS is sodium lauryl sulfate

For a gallon of microemulsion formulation, the components are weighed out in their respective percentages and mixed with water. The percentages are adjusted depending on the volume of water used when making the formulation.

As noted above, a significant advantage of the invention is being able to provide a cleaning product that falls under the EPA's minimum risk pesticide guidelines and is exempt from required registration under the Federal Insecticide, Fungicide, and Rodenticide Act, the exemption found in 40 CFR 152.25(f), which is incorporated by reference in its entirety. Other advantages include the ability to provide a cleaner that is crystal clear for application and have disinfectant and anti-microbial/anti-fungal properties.

What is remarkable about the formulation is that it is a first of its kind in terms of a thyme-based microemulsion that is completely compliant with FIFRA 25(b) as every ingredient in it falls under 25(b); there are no metals and no synthetic thyme products. As importantly, the formulation is a disinfectant 25(b) thyme oil product which could be EPA registered for use on growing crops and harvested crops as well as a disinfectant and pesticide, that could also be EPA 25(b) registered as a disinfectant on any food use site processing facilities, and for cleaning and disinfecting in hospital, schools, home, workplaces, etc.

One particular application of the formulation as a pesticide is to treat citrus greening disease, which is a disease of citrus caused by a vector-transmitted pathogen, by applying the formulation to the citrus plants or trees affected by the disease. Asian citrus psyllid, *Diaphorina citri*, is a sap-sucking, hemipteran bug in the family Psyllidae. It is an important pest of citrus, as it is one of only two confirmed vectors of the serious citrus greening disease. African citrus psyllid, *Trioza erytreae*, also known as the two-spotted citrus psyllid, is another recognized vector of the citrus greening disease.

While a composition is disclosed with a specific surfactant (SLS), a specific antimicrobial for mold and pH adjuster (citric acid), alcohol as an excipient, and a pest control additive (wintergreen oil), an inventive aspect of the formulation is that it only contains all 25(b) components (including both active and inactive ingredients), has a high active content in terms of thyme oil, i.e., 0.15 to 0.30 wt. % and more preferably, 0.195 to 0.276 wt. %, so that its antimicrobial properties are excellent, and the formulation is a crystal clear microemulsion. Thus, the inactive ingredients could vary from the specific ones disclosed providing that substitute inactives are still 25(b) compliant and function in a similar manner as the replaced inactive ingredients.

In this regard, Applicant compared the inventive formulation with other formulations containing thyme oil as an active to show the difference in clarities between the different formulations. The FIG. 1 is a representation of a photograph taken of three different formulations for comparison in terms of the clarity of the formulations. The formulation on the left in the FIG. 1 is a clear microemulsion of the invention with 0.23 wt. % thyme oil and all other components or inert ingredients in this formulation are 25(b) components. The middle formulation is not made up of only 25(b) components, (meaning there are other components that would not be listed as a 25(b) component from the EPA perspective. The middle formulation also has an active content of 0.23% thyme oil, and is not clear at all. The formulation on the right has only 0.05% active content by weight of thyme oil and also includes other inert ingredients that are not 25(b) classified. The clarity of the formulation on the right is much better than the middle formulation, but it is still cloudy and not nearly as clear as the inventive formulation on the left. Also, the microbiocidal efficacy of the formulation on the right is much less than either of the two other formulations due to the vastly reduced thyme oil content. Thus, the formulation on the right, even with its better clarity, is not as effective as the antimicrobial formulation of the invention.

An example of this embodiment of the inventive botanical antimicrobial formulation comprising a clear microemulsion is where the microemulsion consists of thyme oil as an active ingredient in an amount ranging from 0.15 to 0.30 wt. % of the formulation, more preferably 0.195 to 0.276 wt. %, and most preferably around 0.23 wt. % of the total formulation, effective amounts of inactive ingredients, the inactive ingredients selected from the group consisting of an excipient and surfactant for emulsifying and pH adjuster, and an optional additional active that contributes to pest control, with the balance water, all of the components of the formulation, both active and inactive, falling under a 25(b) criteria of the EPA.

The microemulsion can also be used for the removal of dust (dust suppression) and/or disrupt and/or remove bioaerosol particles contained the air by introducing the microemulsion in the air so that it is dispersed and can interact with the dust and/or bioaerosol particles. More particularly, the microemulsion can be dispersed or sprayed into the air in a location where it would be desired to suppress dust and/or remove/disrupt bioaerosol particles in the air in the location of spraying. The location can be a space in a structure or can be outside where dust suppression and/or bioaerosol particle removal is needed. Examples of spaces that could be treated with the inventive formulation for dust suppression and/or bioaerosol particle removal would be hospitals, or laboratories that require cleanliness and a minimum of bacteria. Dust suppression locations could be in construction sites or zones, either inside or outside. In certain applications, only dust is a problem that would need suppression or only bioaerosol particles would be the problem needing treatment. In other situations, both dust and bioaerosols may be present where a location having both needs treatment.

The step of introducing the formulation into a given space can be done with any known spraying or dispersing device, from a handheld sprayer, a sprayer designed to be carried by a user using a sling or harness, hvlp or ulvp sprayers, foggers, misters, or any kind of commercial or industrial sprayer that would be capable of treating a large volume of air at a given location.

In terms of introducing the microemulsion into the air for dust suppression and/or treating of bioaerosol particles, similar types of dilution rates of the formulation can be used as detailed above for the cleaning, disinfecting and plant treatment regimens. An effective amount of microemulsion formulation should be that that would drop out a substantial amount of the dust airborne in a given location as well as treating bioaerosols so that they also drop out of the air or at least become disrupt by cellular damage and the like as described above.

Typical rates for treat an area for dust suppression and bioaerosol treatment as well as other treatment rates are as follows:
  bioaerosol applications 0.2 to 1 ounce per cubic meter;
  plant and animal applications 0.2 to 1 ounce per cubic meter; and
  all other application 1 to 3 ounces per sq. ft.

The formulation has any number of uses, which include using it on plants as a pest control, using it as an insect repellant (flea, mosquito and tick repellant for example), a cleaner, an antimicrobial cleaner, a disinfectant, a deodorizer, a fly repellant for animals, a stainless and glass surface cleaner, a laundry detergent, a carpet cleaner, and a stain remover.

The formulation, which is includes as an active ingredient is directly from whole essential oil of white thyme and is non-toxic, non-corrosive, non-irritating, biodegradable, falling under the EPA GRAS (generally regarded as safe) category, has been shown to be diluted up to 160 times before it loses its effectiveness against salmonella and chicken isolate CP #6 of *Clostridium perfringens* and up to 320 times for turkey isolate of *Clostridium perfringens* and similar results would be expected for other and similar bacteria and the like.

As such, an invention has been disclosed in terms of preferred embodiments thereof which fulfills each and every one of the objects of the present invention as set forth above and provides a new and improved thyme oil and surfactant containing microemulsion formulation that can be used for disinfection and/or cleaning of surfaces, treatment of animals and pets for pest control, and for dust suppression and bioaerosol particle disruption and removal from the air.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A method of suppressing dust and/or removing bioaerosol particles from the air comprising:
  providing a microemulsion comprising, in weight percent:
    thyme oil in an amount ranging from about 0.195 to about 0.276%;
    wintergreen oil in an amount ranging from about 0.128 to about 0.207%;
    at least one surfactant, the at least one surfactant comprising a soap as listed in EPA Inert Ingredients Eligible for FIFRA 25(b) Pesticide Products (Revised November 2016) and sodium lauryl sulfate, wherein the total amount of the surfactants ranges from about 2.159 to about 3.015%;
    citric acid in an amount ranging from about 0.994 to about 1.358%;
    isopropanol in an amount ranging from about 1.351 to about 1.886%; and
  water, the weight percentages based on the weight of a gallon of water, or 8.3 lbs; and
  dispersing the microemulsion into air in an effective amount to either:
    a) suppress dust contained in the air; or
    b) remove and/or disrupt bioaerosol particles in the air; or
    c) suppress dust contained in the air and remove and/or disrupt bioaerosol particles in the air.

2. The method of claim 1, wherein the microemulsion is dispersed into an enclosed space in a structure.

3. The method of claim 1, wherein the pH of the microemulsion is between 6.0 and 8.0.

4. The method of claim 1, wherein all components of the microemulsion are listed on the EPA Inert Ingredients Eligible for FIFRA 25(b) Pesticide Products (Revised November 2016) and Active Ingredients Eligible for Minimum Risk Pesticide Products (Updated December 2015).

5. The method of claim 1, wherein the dispersing step further comprising spraying of the microemulsion.

* * * * *